United States Patent Office 3,794,627
Patented Feb. 26, 1974

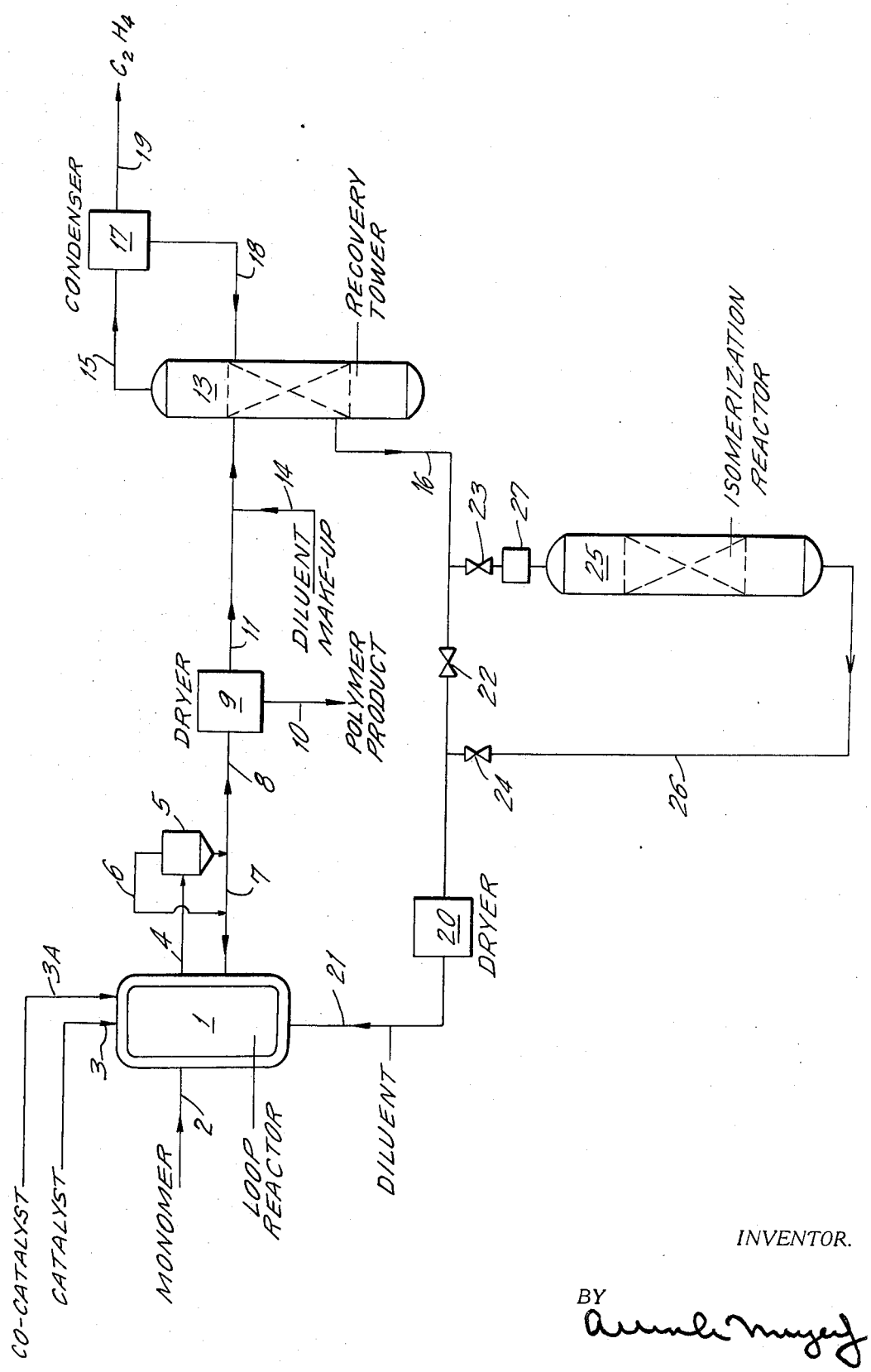

3,794,627
PROCESS FOR THE PRODUCTION OF ETHYLENE/ BUTENE-1 COPOLYMERS AND ETHYLENE HOMOPOLYMERS
John J. Giachetto, Riverside, Conn., assignor to National Petro-Chemicals Corporation, New York, N.Y.
Filed July 27, 1971, Ser. No. 166,382
Int. Cl. C08f 15/40
U.S. Cl. 260—88.2 R 12 Claims

ABSTRACT OF THE DISCLOSURE

A process for consecutively forming copolymers of ethylene with butene-1 having successively lower butene-1 fractions, or for consecutively forming ethylene/butene-1 copolymers and ethylene homopolymers, in which the butene-1 in the recycle stream is isomerized to non-reactive butene-2- when it is desired to decrease or eliminate the butene-1 in the polymer formed.

BACKGROUND OF THE INVENTION

This invention relates to the polymerization of ethylene, and more particularly to a process for the alternate and successive copolymerization of ethylene with butene-1 and homopolymerization thereof, or to successively lower butene-1 copolymerizations. Specifically, it relates to such a process in which the butene-1 co-monomer utilized in the copolymerization operations is deactivated for subsequent ethylene homopolymerization or a portion of the butene-1 is deactivated for subsequent copolymerization at a lower butene-1 concentration.

The formation of ethylene homopolymers and copolymers with butene-1 employing the so-called solution process, or the particle form or other suspension techniques is, of course, well known. In such procedure the ethylene or ethylene/butene-1 to be polymerized is dissolved or dispersed in an appropriate hydrocarbon diluent and reacted in the presence of a suitable catalyst to form the desired polymer product. As is well known, the polymerization may be carried out at relatively low temperatures, e.g., at from about 100° to 450° F., and pressures, e.g., at from about 15 to 700 p.s.i.a. Some catalysts known to be useful in such process include the oxides of molybdenum, chromium, or silica; alumina, zirconia or thoria; and the coordination type catalysts. Coordination catalysts are complexes formed by the interaction of alkyls of metals of Groups I–III of the Periodic Table with halides and other derivatives of transition metals of Groups IV–VIII. A typical coordination catalyst which may be employed in the present process is a complex between an aluminum alkyl and a titanium halide.

The hydrocarbon diluents which can be used for the polymerization reaction are liquid and chemically inert under the reaction conditions. Paraffins with 3 to 12 carbon atoms per molecule can be used as the diluent. Examples of such paraffins include propane, n-butane, isobutane, n-pentane, isopentane, n-hexane, isooctane, and the like. Mixtures of paraffins, isoparaffins and/or naphthenic hydrocarbons may also be utilized. The naphthenic hydrocarbons which may be utilized in the process hereof are those which can be maintained in the liquid phase under the conditions of polymerization. These hydrocarbons contain 5 or 6 carbon atoms in a naphthenic ring and include such compounds as cyclohexane, cyclopentane, methylcyclopentane, ethyl cyclohexane and the like.

Conventionally, the homopolymers or copolymers produced as aforesaid are separated from the diluent, the unreacted monomer or monomers, and in some processes from the catalyst (depending upon the particular catalyst system utilized), and subsequently recovered. The residual diluent is separated from the unreacted ethylene monomer and recycled for further use. Moreover, when (as is frequently the case) it is desired to employ the same commercial installation for the consecutive formation of ethylene/butene-1 copolymers and ethylene homopolymers, or to consecutively produce different grades of ethylene/ butene-1 copolymers, it is particularly important to remove all or a portion of the copolymerizable butene-1 from the recycled diluent stream, or to otherwise "deactivate" all or a portion of the butene-1 prior to commencing any subsequent polymerization operations.

When relatively high boiling diluents are utilized, such may be readily separated from the unreacted ethylene or ethylene/butene-1 comonomers by relatively simple fractionation techniques, and recycled in substantially pure form. The choice of lower boiling diluents, e.g., n-butane or isobutane, is, however, frequently indicated, particularly in particle form operations in which the use of such materials (which are poor solvents for the polymers formed) makes possible the production of relatively high melt index polymeric products. These lower boiling diluents boil at temperatures approximating the boiling point of butene-1 and cannot, therefore, be readily separated from the latter by simple fractionation procedures. To the contrary, the multi-stage distillation equipment necessary to attempt such separations is exceedingly complex and expensive to install, operate and maintain.

It is, therefore, a principal object of the present invention to provide a process for the consecutive production of ethylene/butene-1 copolymers and ethylene homopolymers, in which the butene-1 monomer can be efficiently and effectively "deactivated" to facilitate conversion from copolymer- to homopolymer-forming operations, or in which a portion of the butene-1 monomer can be efficiently and effectively "deactivated" to facilitate conversion from a high concentration butene-1 copolymer to one of lower butene-1 concentration. A further object is to provide such a process in which the quantity of "intermediate" polymer formed during the transition from copolymer to homopolymer product may be minimized and the necessity of discarding such product markedly reduced, if not entirely eliminated. Other objects and advantages of the invention will be apparent from the following detailed description of preferred embodiments thereof, considered in the light of the accompanying drawing, which is a schematic diagram illustrating in flow sheet form the several steps which may be utilized in the process hereof.

SUMMARY OF THE INVENTION

The present invention resides in a process for consecutively polymerizing ethylene monomer to form substantially solid polymers selected from the group consisting of ethylene/butene-1 copolymers and ethylene homopolymers in which the monomeric materials are reacted in a liquid hydrocarbon diluent and in the presence of a suitable catalyst, the polymeric products are removed and recovered, and the diluent and unreacted monomeric material is recycled for further reaction. In accordance with the invention, butene-1 monomer is totally or partially removed from the diluent/butene-1 recycle stream formed during the copolymerization operation so that ethylene homopolymers or lower butene-1 copolymers can be formed in the reaction system. The butene-1 monomer is removed by isomerization of butene-1 to butene-2, and thereafter recycling the resulting diluent/butene-2 stream for ethylene homopolymerization or, alternatively, recycling the diluent/butene-1/butene-2 stream for the production of copolymers incorporating varying concentrations of the butene-1 co-monomer. Over 80% of the copolymerizable butene-1 may thus be "deactivated" by conversion to the non-reactive butene-2. In this manner diluent/butene-1 streams containing up to about 10% by weight butene-1 may be converted to streams incorporating the non-reactive butene-2 and less than about 2% by weight of the reactive butene-1.

PREFERRED EMBODIMENTS OF THE INVENTION

In the following description, the process of the invention will be described with particular reference to a particle form process for the production of normally solid ethylene polymers in an isobutane diluent, in which the polymer products are formed as a slurry of non-agglomerating, particulate solids in the isobutane. It will, however, be understood that the butane-1 deactivation technique of this invention may also be employed in connection with ethylene polymerization processes carried out in solution, as well as in either particle form or solution operations which make use of liquid hydrocarbon diluents other than isobutane. The process is, however, particularly applicable to particle form operations utilizing isobutane as the inert diluent because of the desirability of employing such diluent in particle form systems and the difficulty of otherwise separating the butene-1 co-monomer from the diluent recycle stream formed during copolymerization operations therein.

Referring to the preferred embodiment schematically illustrated in the attached drawing the consecutive operations for first copolymerizing ethylene and butene-1, and thereafter homopolymerizing the ethylene monomer, are effected within a reactor 1. The reactor suitably comprises a loop reactor such as described in Norwood U.S. Pat. No. 3,248,179 of Apr. 26, 1966, in which the monomeric materials are reacted in an appropriate diluent in admixture with a suitable catalyst within a continuous path reaction zone at temperatures and pressures such that substantially all the diluent is in the liquid phase and the polymers are formed slurried therein. It will be understood that the various diluents, catalyst materials and reaction conditions described as useful in the noted patent may similarly be utilized in the practice of the present process. Alternatively, other known reactor systems can similarly be employed in the practice of this invention.

Ethylene and butene-1 monomer and isobutane make-up diluent are fed into the loop reactor 1 through conduit 2, while the catalyst material is simultaneously introduced into the reacton from stream 3, any co-catalyst being admixed therewith or separately fed through line 3A. Other streams, including a diluent recycle stream 21 described hereinafter, and hydrogen or other modifier streams, are also fed into the reactor as desired. The butene-1 monomer may be added as aforesaid or, alternatively, all or part of the reactive co-monomer may be formed in situ in the loop reactor by the addition of a suitable ethylene dimerization catalysts, e.g., titanium tetraoctylate or titanium tetrahexylate, to the catalyst feed.

The polymer product is removed from the loop reactor through stream 4 in the form of a slurry having, for example, a 20–50% solids concentration. As illustrated, the polymer slurry may be separated and recovered in a cyclone collector 5 provided with a recycle stream 6 and a slip stream 7 for the return of diluent and excess polymer solids, respectively, to the loop reactor. Alternatively, the product slurry may be recovered from the pressurized loop reactor system employing gravitational settling legs such as described, for example, in Scoggin U.S. Pat. No. 3,242,-150 of Mar. 22, 1966. Yet further, product slurry may be removed directly from the reactor for direct recovery of solids, embodying a representative take-off product from the reactor.

However recovered, the polymer slurry is thereafter fed via a conduit 8 to a suitable dryer 9 for recovery and drying of the polymer product. Dryers which are so useful are known per se and include flash hopper-conveyor dryer systems such as described, for example, in Scoggin et al. U.S. Pat. No. 3,152,872 of Oct. 13, 1964, and fluidized bed drying systems such as disclosed in Ross Pat. No. 3,073,810 of Jan. 15, 1963. The dried polymer product is ultimately recovered in stream 10 and the residual diluent/unreacted monomer stream 11 treated as indicated hereinafter for the recovery and/or recycle of the respective components thereof.

Separation of the isobutane diluent and butene-1 co-monomer from unreacted ethylene monomer is effected in a recovery tower 13, into which the diluent/monomer stream 11 is fed admixed, if desired, with additional diluent from make-up stream 14. Tower 13 is so operated as to recover ethylene and other light hydrocarbon and hydrogen vapors overhead through stream 15 and a side stream 16 containing the isobutane diluent and butene-1 co-monomer. The overhead vapors are thereafter totally or partially condensed in condenser 17, a portion rich in ethylene being recycled to the recovery tower in stream 18 and the remainder containing a lesser concentration of ethylene being recovered through recovery stream 19 or otherwise disposed of.

During copolymerization operations the diluent/co-monomer stream 16 may be passed through a suitable dryer 20 and the resulting dried isobutane/butene-1 mixture directly recycled to the loop reactor 1.

When it is desired to conduct homopolymerization operations, or copolymerization operations, employing lesser proportions of butene-1 co-monomer, the flow of any dimerizing catalyst employed to form the butene-1 co-monomer in situ within the loop reactor is terminated or decreased and/or such material is otherwise "deactivated", and the butene-1 already present in the reaction system is removed in accordance with the present process. For such purpose, a valve 22 is totally or partially closed and valves 23 and 24 are opened to divert the total or a portion of the isobutane/butene-1 stream 16 through heater 27 and isomerization reactor 25 wherein the reactive butene-1 is substantially converted to the inert butene-2. The thus treated stream 26 is passed through dryer 20 and recycled to the loop reactor through stream 21. Since the butene-1 is thus "deactivated" by conversion to butene-2, the reaction system may be converted from the formation of copolymer to homopolymer without the production of any substantial quantities of intermediate polymer materials which must be discarded.

In isomerization reactor 25 the butene-1 is converted to butene-2 by contact with a suitable isomerization catalyst. Typical catalysts so useful include molecular sieves, e.g., zeolites which have been treated with aluminum or zirconium salts or with an acid such as hydrogen chloride to replace the sodium of the zeolite with aluminum, zirconium, or hydrogen ions; alumina in combination with other oxides such as silicon dioxide, boron oxide, thoria and zirconia; hydrofluoric acid-treated alumina; aqueous solutions of phosphoric or sulfuric acid, particularly when used together with suitable additional agents such as cadmium sulfate or oxide, beryllium oxide or boric acid; aluminum sulfate-or hydrogen chloride-treated silica gels; and the like. The use of molecular sieves as isomerization catalysts in the process of this invention is particularly preferred, in view of the high conversions of butene-1 to butene-2 obtained with such catalysts.

The isomerization is carried out under those conditions of temperature, pressure, and reactant space velocities as will optimize conversion of butene-1 to butene-2. The selection of operating temperatures is, as a practical matter, based upon the efficiency of the isomerization reactor and the pressure available in the installation employed. The isomerization is conducted above the critical temperature of the solvent system in order to maintain the reaction system in the vapor phase. The maximum reaction temperature possible is limited by the stability of the catalyst used and the organic reactants, the equilibria of the isomerization reaction, and the usual economic factors. Generally, reaction temperatures of from about 200° to 450° F., preferably from about 280° to 400° F., have been found useful in the process of this invention.

When, for example, isobutane is utilized as the diluent for the reaction mixture, temperatures above the critical temperature of such material (273° F.) are so employed, suitably temperatures of from about 280° to 385° F., and preferably from about 350° to 385° F. When temperatures close to the critical temperature are used, the rate of isomerization decreases, and it is necessary to utilize low space velocities to maintain high conversions.

The isomerization reaction may be carried out at any desired pressures, the use of higher pressures being somewhat preferred since such results in increased residence time of the gaseous reaction mixture in the bed for any given liquid feed rate. The isomerization may thus be carried out at pressures of from 0 to about 500 p.s.i.a., preferably from about atmospheric pressure to 250 p.s.i.a.

Employing molecular sieve isomerization catalysts, operating under temperature and pressure conditions within the ranges indicated above, and utilizing space velocities of from about ½ to 9, desirably from about 2 to 6, volumes of liquid solution per volume of packed bed per hour, 80% or greater conversions of butene-1 to butene-2 are obtained.

The following specific example serves to further illustrate a preferred embodiment of the process of the present invention without, however, being limiting thereof. Unless otherwise specified, all temperatures given in the example are in ° F., all throughputs are expressed in parts per hour, and all parts and percentages are by weight. Space velocities given are in volumes of liquid solution per volume of packed catalyst bed per hour.

EXAMPLE 7160 parts of ethylene monomer are fed into the loop reactor 1 through inlet stream 2, while simultaneously a diluent recycle incorporating 7720 parts of isobutane, 230 parts of butene-1, and minor amounts of other materials is introduced into the reactor through stream 21. A stream containing 2.0 parts of an alkyl aluminum cocatalyst in an inert diluent, primarily isobutane, is introduced into the reactor through stream 3A. A slurry containing 4 parts of a halide of a transition metal on a support is introduced into the reactor through stream 3 in an inert diluent, primarily isobutane. Isobutane make-up diluent, hydrogen, and a dimerizing catalyst (titanium tetraoctylate) are also continuously fed into the reactor.

The loop reactor is maintained at a temperature of 140° F. under a pressure of 500 p.s.i.a. A polymer slurry containing about 25 weight percent solids is formed in the reactor and removed through stream 4 into the cyclone separator 5. After recovery from the cyclone and treatment in dryer 9, a polymer product stream 10 is recovered comprising 6500 parts of an ethylene/butene-1 copolymer.

The residual stream 11 principally containing isobutane diluent and unreacted ethylene and butene-1 monomer is introduced into the recovery tower 13, ethylene monomer being recovered overhead through stream 15 and an isobutane recycle containing 7720 parts of isobutane, 230 parts of butene-1 and minor proportions of other materials being recovered as a side stream 16 therefrom. Stream 16 is thereafter recycled to the loop reactor for further copolymerization operations.

When it is desired to convert to the formation of ethylene homopolymer, valve 22 is closed and valves 23 and 24 opened to permit the diluent, butene-1 stream 16 to pass through the isomerization reactor 26. Passing the mixture through such reactor at a temperature of 380° F. and under a pressure of 220 p.s.i.a. at a space velocity of 5 results in about 85% conversion of the butene-1 to butene-2. The thus treated stream 26 containing 7720 parts of isobutane, 35 parts of butene-1, 195 parts of butene-2, and minor proportions of other materials is thereafter dried and recycled to the loop reactor for use in forming ethylene homopolymer.

Upon passing the diluent recycle stream through the isomerization circuit, the feeds to the loop reactor are appropriately modified, the flow of dimerization catalyst being terminated and the butene-1 present in the isobutane recycle being drastically decreased as aforesaid.

Various modifications may be made in the preferred forms of the invention described hereinabove without departing from the scope of this invention. The specific embodiments disclosed are, therefore, intended as illustrative only.

What is claimed is:

1. In a process for polymerizing a feed stream the monomeric component of which consists essentially of ethylene and butene-1 to sequentially form polymers selected from the group consisting of copolymers of ethylene with butene-1 and homopolymers of ethylene, which comprises reacting the monomeric materials within a polymerization zone in a liquid hydrocarbon diluent and in the presence of a catalyst effective to catalyze the polymerization of ethylene and butene-1 but ineffective to catalyze the polymerization of butene-2, said catalyst being selected from the group consisting of oxides of molybdenum, chromium and silica; alumina; zirconia; thoria; and the coordination catalysts, removing and recovering the polymeric products from the polymerization zone, and recycling diluent and unreacted monomeric material for further reaction, the improvement comprising alternately and successively polymerizing ethylene to ethylene homopolymer and copolymerizing ethylene and butene-1 to copolymers containing successively lower butene-1 contents by
    (a) separating a portion of the reaction mixture formed during the ethylene/butene-1 copolymerization;
    (b) substantially isomerizing the butene-1 in the separated stream to butene-2 in the presence of a second catalyst effective to isomerize butene-1 to butene-2 at temperatures above the critical temperature of the diluent and under pressures of from 0 to 500 p.s.i.a.; and
    (c) recycling the resulting butene-2/diluent stream to the polymerization zone, any further copolymerization resulting from the reaction of ethylene and butene-1 present in the original feed and not isomerized.

2. The process of claim 1, wherein the second catalyst utilized to catalyze the isomerization of butene-1 to butene-2 in step (b) is selected from the group consisting of molecular sieves, alumina in combination with another oxide, hydrofluoric acid-treated alumina, phosphoric acid, sulfuric acid, and aluminum sulfate- or hydrogen chloride-treated silica gels.

3. The process of claim 1, wherein the diluent is isobutane and in which the polymerization zone is a smooth continuous path reaction zone maintained at temperatures and pressures such that substantially all the isobutane is in the liquid phase and the polymers produced are in the form of solid particles slurried therein.

4. The process of claim 3, wherein the stream isomerized in step (b) contains from 1 to 5% by weight butene-1 and is passed over the isomerization catalyst at space velocities of from 0.5 to 9 volumes of said stream per volume of said catalyst per hour to decrease the butene-1 content to less than 0.75% by weight.

5. The process of claim 3, in which the second catalyst utilized to catalyze the isomerization of butene-1 to butene-2 in step (b) is selected from the group consisting of molecular sieves, alumina in combination with another oxide, hydrofluoric acid-treated alumina, phosphoric acid, sulfuric acid, and aluminum sulfate- or hydrogen chloride-treated silica gel, and in which the isomerization is carried out at temperatures of from 280° to 385° F. and under pressures of from atmospheric to 250 p.s.i.a., at which conditions said catalyst is effective to isomerize butene-1 to butene-2.

6. The process of claim 1, wherein the butene-1 stream is isomerized in step (b) at space velocities of from ½ to 9 volumes of liquid feed per volume of the isomerization reaction zone per hour.

7. The process of claim 1, wherein the stream isomerized in step (b) contains up to 10% by weight butene-1 and in which the stream recycled in step (c) contains less than 2% by weight butene-1.

8. The process of claim 1, wherein the diluent utilized in the process in n-butene, i-butane or a mixture thereof.

9. A process for reducing or eliminating the butene-1 content within a polymerization zone of a reaction mixture, the monomeric component of which consists essentially of ethylene and butene-1, in a liquid hydrocarbon diluent and the presence of a catalyst effective to catalyze the polymerization of ethylene and butene-1 but ineffective to catalyze the polymerization of butene-2, said catalyst being selected from the group consisting of oxides of molybdenum, chromium and silica; alumina; zirconia; thoria; and the coordination catalyst, which comprises removing a recycle stream containing butene-1 and the diluent from the polymerization zone, isomerizing the butene-1 in the recycle stream to butene-2 in the presence of a second catalyst effective to isomerize butene-1 to butene-2 at temperatures above the critical temperature of the diluent and under pressures of from 0 to 500 p.s.i.a., and recycling the thus isomerized stream to the polymerization zone for the formation of polymers having lower butene-1 contents.

10. The process of claim 9, wherein the second catalyst utilized to catalyze the isomerization of butene-1 to butene-2 in step (b) is selected from the group consisting of molecular sieves, alumina in combination with another oxide, hydrofluoric acid-treated alumina, phosphoric acid, sulfuric acid, and aluminum sulfate- or hydrogen chloride-treated silica gels.

11. The process of claim 9, wherein the diluent utilized in the process is n-butane, i-butane or a mixture thereof.

12. The process of claim 9, wherein the diluent is isobutane and in which the polymerization zone is a smooth continuous path reaction zone maintained at temperatures and pressures such that substantially all the isobutane is in the liquid phase and the polymers produced are in the form of solid particles slurried therein.

References Cited

UNITED STATES PATENTS

| | | | |
|---|---|---|---|
| 2,956,989 | 10/1960 | Jezl | 260—88.2 |
| 3,250,755 | 5/1966 | Natta | 260—88.2 |
| 3,274,167 | 9/1966 | Doak | 260—88.2 |
| 3,335,120 | 8/1967 | Hagemeyer | 260—93.7 |
| 3,361,727 | 1/1968 | Lutz | 260—93.7 |
| 3,489,731 | 1/1970 | Imoto | 260—80.78 |

JOSEPH L. SCHOFER, Primary Examiner

R. S. BENJAMIN, Assistant Examiner

U.S. Cl. X.R.

260—94.9 B, F, D